//h1 UNITED STATES PATENT OFFICE.

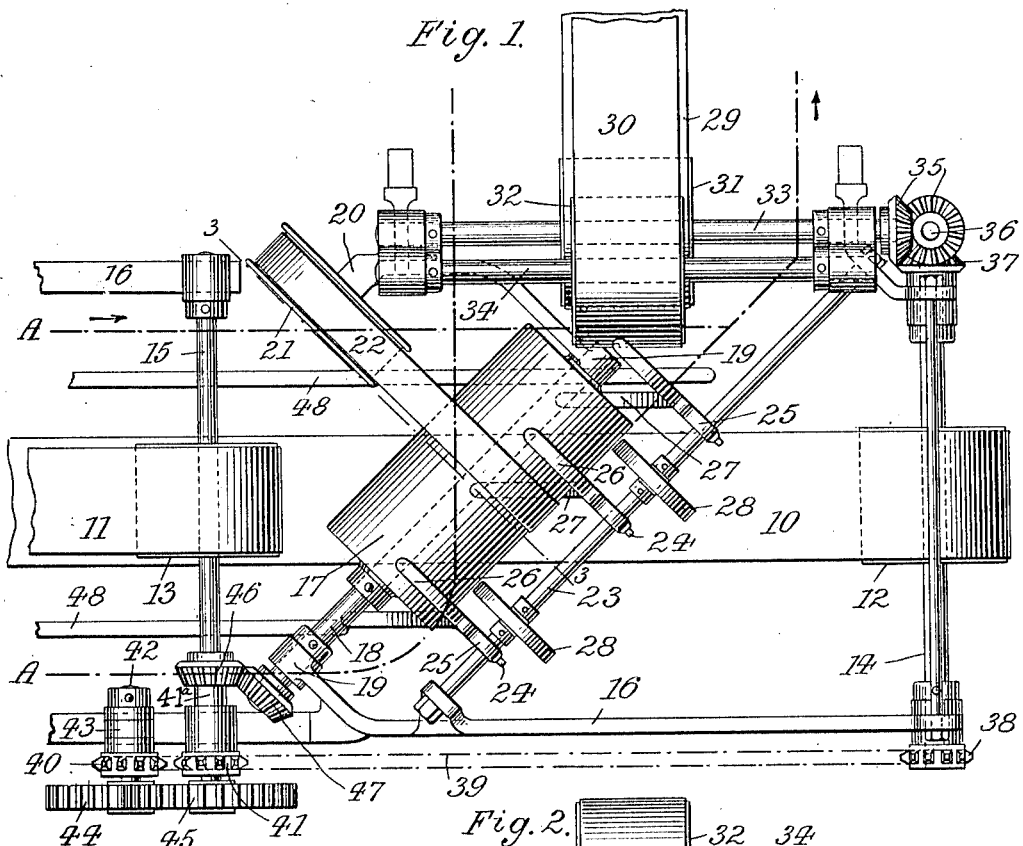

HORACE L. ROBERTS, OF NEW YORK, N. Y.

CARRIER.

1,001,307.   Specification of Letters Patent.   Patented Aug. 22, 1911.

Application filed June 1, 1910.   Serial No. 564,383.

*To all whom it may concern:*

Be it known that I, HORACE L. ROBERTS, a citizen of the United States, residing at New York city, Brooklyn, county of Kings, State of New York, have invented new and useful Improvements in Carriers, of which the following is a specification.

This invention relates to improvements on carriers which are more particularly designed to convey newspapers or similar articles from the press-room to the distributing or other room.

The invention comprises more particularly novel means for permitting a ready change of the course along which the papers travel, so that the carrier may be easily adapted to any peculiar shape of the building in which the printing presses, etc., are located.

With the carrier to which my invention pertains, the folded newspapers are fed forward in overlapping order between a pair of superposed belt-conveyers. If a change of course in the horizontal direction is necessary, I provide at the point of intersection between the two adjacent conveyer-runs, a transferring drum set at an angle to said runs, and which automatically takes the newspapers off the first conveyer and delivers them to the second conveyer.

The invention also comprises novel means for effecting a positive movement of the newspapers partly around said drum and other details of construction more fully pointed out in the appended claims.

In the accompanying drawing: Figure 1 is a plan of my improved carrier, Fig. 2 a front elevation thereof, and Fig. 3 a vertical cross section on line 3—3, Fig. 1.

The numeral 10 indicates part of a lower delivery belt or conveyer which is surmounted by an upper delivery belt 11 in such a manner that the adjacent inner runs of both belts travel in the same direction, *i. e.* to the right (Figs. 1 and 2). Belt 10 runs over a pulley 12, while belt 11 engages a pulley 13, which is set back from pulley 12 so as to leave part of the upper run of belt 10 uncovered. Pulleys 12 and 13 are keyed to transverse shafts 14, 15 which are hung in a suitable frame 16 and receive motion in manner hereinafter described. Directly above the uncovered section of belt 10 is mounted a horizontal transposing drum 17 the axis of which extends obliquely to the direction of the belt travel. Drum 17 is secured to a shaft 18 which is rotatably mounted in suitable bearings 19 of frame 16. Opposite drum 17 and in the same horizontal plane, is mounted the axle 20 of an idler 21, the diameter of which exceeds somewhat that of drum 17. The latter and idler 21 are connected by an endless take-up belt 22 whose lower run contacts with the upper run of belt 10, and, owing to the enlarged diameter of idler 21, deflects said upper run slightly downward. At the opposite side of drum 17, there is mounted in parallelism therewith a stationary spindle 23. Upon the latter are adjustably secured by set screws 24, a series of holders 25 which are provided with upper and lower guide fingers 26, 27 respectively. These fingers are curved concentrically to drum 17 and are spaced therefrom so as to provide a curved passage between drum and fingers. The upper fingers 26 extend at right angles to drumshaft 18 while lower fingers 27 are deflected to extend in the direction of belt 10. If desired, a pair of idlers 28 may be loosely mounted on spindle 23, said idlers assisting belt 22 and fingers 26, 27 in carrying the newspapers around drum 17 by reducing the frictional contact between the papers and said fingers.

At even height with the upper face of drum 17, there extends at right angles to belt 10 and in a plane parallel to that of belt 10 the upper run of a lower receiving belt or conveyer 29, which is surmounted by an upper receiving belt 30. Belts 29, 30 run over pulleys 31, 32, which are keyed to shafts 33, 34 turning in suitable bearings of frame 16.

The several belts and the transferring drum may be driven and intergeared in any suitable manner, the drawing showing shaft 33 to be operatively connected with shaft 14 by miter wheels 35, arbor 36 and miter wheels 37. Shaft 14 is, in turn, by chain wheel 38 and chain 39 connected with a pair of chain wheels 40, 41 of which wheel 40 is keyed to an arbor 42 while wheel 41 is secured to a sleeve 41ᵃ loosely embracing shaft 15 of pulley 13. Arbor 42 is mounted in a bearing 43 of frame 16 and carries at its outer end a relatively fixed toothed wheel 44 which meshes into a similar wheel 45 keyed to shaft 15. It will be seen that by the construction described, pulley 13 will be rotated in a direction opposite to that of pulley 12, so that the adjacent runs of belts 10 and 11 travel in the same direction. Upon the sleeve of wheel 41 is fastened a beveled gear wheel 46 engaging a similar wheel 47 secured to the shaft 18 of the transferring drum 17.

For operating the device, either one of the conveyers 10 and 29, preferably the latter is driven from the pulley supporting the outer end of said conveyer (not shown). The motion of conveyer 29 is by gearings 35, 36, 37 transmitted to shaft 14, thus imparting motion to pulley 12 and conveyer 10. Simultaneously rotary motion is transmitted from shaft 14 to shaft 15 by chain drive 38, 39, 40, 41, arbor 42, and gear wheels 44, 45, in such a manner that pulley 13 turns in an opposite direction to pulley 12. Finally drum 17 receives rotary movement from shaft 15 by gear wheels 46, 47, said drum taking along belt 22 by frictional contact.

The newspapers to be carried are placed in overlapping order upon the outer end of belt 10, to be conveyed between belts 10 and 11 toward drum 17, during which travel the papers may find additional support on side rails 48. When the papers reach belt 22 they are caught by the latter and are carried toward drum 17 to be fed partly around said drum, in which operation belt 22 is assisted by fingers 27, 26 and idlers 28. After the train of papers has thus been overturned and has arrived at the top of drum 17, it will leave said drum in a direction at right angles to the travel of belt 10. The papers are finally received between belts 29, 30 to be carried to their place of destination. The course of the papers while passing along my improved deflecting device is indicated by the dot and dash lines A in Fig. 1.

It is obvious that the delivery conveyer and the receiving conveyer need not extend at right angles to each other, but that they may be set at any angle desired. For a proper operation it is however necessary that the axis of the transferring drum extends at right angles to the bisecting line of the angle formed by both conveyers. Thus, with the arrangement illustrated the axis of drum 17 extends at an angle of 45° to belts 10 and 29.

It will be seen that by the construction described the course of the carrier may be readily laid to conform to the peculiar configuration of the walls and partitions so that a free tortuous run from room to room or around obstacles within the rooms may be insured.

I claim:

1. A device of the character described, comprising an endless delivery conveyer, an independent endless receiving conveyer set at an angle to the delivery conveyer, and a transferring drum intermediate the conveyers, the operative run of the delivery conveyer extending tangentially to the bottom of the drum, while the operative run of the receiving conveyer extends tangentially to the top of said drum.

2. A device of the character described, comprising a delivery conveyer, a receiving conveyer extending at an angle to the delivery conveyer, a transferring drum intermediate both conveyers, and a take-up belt engaging said drum.

3. A device of the character described, comprising an endless delivery conveyer, an independent endless receiving conveyer set at an angle to the delivery conveyer, a transferring drum intermediate the conveyers, the operative run of the delivery conveyer extending tangentially to the bottom of the drum, while the operative run of the receiving conveyer extends tangentially to the top of said drum, and means for guiding the article to be conveyed partly around said drum.

4. A device of the character described, comprising a delivery conveyer, a receiving conveyer extending at an angle to the delivery conveyer, a transferring drum intermediate both conveyers, a series of guide fingers that partly encircle the drum and are spaced therefrom, and idlers intermediate said fingers.

5. A device of the character described, comprising a delivery conveyer, a receiving conveyer extending at an angle to the delivery conveyer, a transferring drum intermediate both conveyers, and a series of upper and lower guide fingers that partly encircle the drum and are spaced therefrom, the lower fingers extending in the direction of the delivery conveyer.

6. A device of the character described, comprising a lower delivery belt, a first pulley engaged thereby, an upper delivery belt, a second pulley set back from the first pulley and engaged by said second belt to leave part of the lower belt exposed, a transferring drum above the exposed lower belt-section, a lower receiving belt the upper run of which is level with the upper face of the drum, and an upper receiving belt above the lower receiving belt.

HORACE L. ROBERTS.

Witnesses:
ARTHUR E. ZUMPE,
FRANK V. BRIESEN.

Copies of this patent may be obtained for five cents each, by addressing the "Commissioner of Patents, Washington, D. C."